United States Patent
Naito et al.

(10) Patent No.: US 6,174,835 B1
(45) Date of Patent: *Jan. 16, 2001

(54) EXHAUST GAS PURIFYING DEVICE AND METHOD FOR PURIFYING EXHAUST GAS

(75) Inventors: Isao Naito; Kazuo Oosumi; Yasuaki Unno, all of Kanagawa (JP)

(73) Assignee: Isuzu Ceramics Research Institute Co., Ltd., Fujisawa (JP)

(*) Notice: Under 35 U.S.C. 154(b), the term of this patent shall be extended for 0 days.

This patent is subject to a terminal disclaimer.

(21) Appl. No.: 09/319,658

(22) PCT Filed: Oct. 29, 1998

(86) PCT No.: PCT/JP98/04620

§ 371 Date: Jun. 10, 1999

§ 102(e) Date: Jun. 10, 1999

(87) PCT Pub. No.: WO99/19060

PCT Pub. Date: Apr. 22, 1999

(30) Foreign Application Priority Data

| Oct. 14, 1997 | (JP) | 9-296405 |
| Mar. 26, 1998 | (JP) | 10-098294 |
| May 20, 1998 | (JP) | 10-155165 |
| Jun. 6, 1998 | (JP) | 10-173875 |

(51) Int. Cl.⁷ .................................... B01J 23/00
(52) U.S. Cl. ................ 502/325; 502/341; 502/346; 423/594; 423/598; 423/599; 423/213.2; 423/213.5; 423/219; 423/235; 423/239.1
(58) Field of Search .................. 502/525, 302, 502/324, 352, 326–340, 343, 344, 345, 350, 341, 346, 325; 423/593, 594, 598, 599, 213.2, 213.5, 219, 235, 239.1

(56) References Cited

U.S. PATENT DOCUMENTS

| 4,290,878 | * | 9/1981 | Blanton, Jr. | 208/120 |
| 4,380,510 | * | 4/1983 | D'Aniello, Jr. | 252/466 |
| 4,678,770 | * | 7/1987 | Wan et al. | 502/304 |
| 5,728,643 | * | 3/1998 | Naitoh et al. | 502/302 |
| 5,759,947 | * | 6/1998 | Zhou | 502/324 |
| 5,820,833 | * | 10/1998 | Kawamura | 422/174 |
| 5,847,497 | * | 12/1998 | Mehrotra et al. | 313/346 DC |
| 5,847,498 | * | 12/1998 | Mehrotra et al. | 313/352 |
| 5,883,041 | * | 3/1999 | Pak et al. | 502/524 |
| 5,939,354 | * | 8/1999 | Golden | 502/525 |
| 6,033,632 | * | 3/2000 | Schwartz et al. | 422/190 |

* cited by examiner

Primary Examiner—Tom Dunn
Assistant Examiner—Cam N. Nguyen
(74) Attorney, Agent, or Firm—Staas & Halsey LLP

(57) ABSTRACT

An exhaust gas purifying catalyst for use in an oxygen surplus atmosphere, includes a brown millerite composite oxide for directly decomposing and absorbing nitrogen oxide ($NO_x$), and a noble metal-series reducing catalyst disposed on the surface of said brown millerite composite oxide. The brown millerite composite oxide is represented by one of the following formulae:

$$A_{3-a}B_aC_{4-b}D_bO_9,$$

$$A_{2-a}B_aC_{2-b}D_bO_5, \text{ and}$$

$$A_{1-a}B_aC_{2-b}D_bO_4$$

where A and B are elements selected from the group consisting of Ba, Ca, Sr, Mg and Ce, C and D are elements selected from the group consisting of Y, Dy, Zn, Ti, Mn, Fe, Co, Ni, Cu, Sn, Zr and Nd, a is within the range $0 \leq a < 1$, and b is within the range $0 \leq b < 2$.

25 Claims, 7 Drawing Sheets

EXHAUST GAS PURIFYING DEVICE AND METHOD FOR PURIFYING EXHAUST GAS

BACK GROUND OF THE INVENTION

1. Field of the Invention

The present invention relates to an exhaust gas purifying catalyst for removing nitrogen oxide (NOx) in exhaust gases of a lean-burn internal combustion engine or the like, and particularly to an exhaust gas purifying catalyst which exhibits a high-efficient exhaust gas purifying rate under the surplus oxygen atmosphere and is excellent in durability.

2. Description of the Related Art

The conventional exhaust gas purifying catalysts for purifying nitrogen oxide (NOx) contained in the exhaust gas of vehicles used the catalyst using alumina or zeolite, and the ternary catalyst in which noble metal is carried on a carrier formed of alumina or zeolite. However, these have less effect with respect to the exhaust gas of the Diesel engine with lean burning. Therefore, a catalyst of Perovskite type has been developed to purify the exhaust gas containing a large quantity of oxygen. However, the catalyst poses a problem in that the reduction rate of nitrogen oxide of the exhaust gas is low.

In the catalyst disclosed in Japanese Patent Application Laid-Open No. 5-317652, in the lean-burn state of the Diesel engine, nitrogen oxide (NO) is oxidized into nitrogen dioxide ($NO_2$) by noble metal salt and adsorbed on alkaline earth metal salt such as salt of Barium (Ba), Strontium (Sr), Calcium (Ca), Magnesium (Mg), etc. and then the NOx is further reduced and released. However, the catalyst cannot be sufficient in terms of the nitrogen oxide removing rate and the durability.

SUMMARY OF THE INVENTION

It is an object of the present invention to provide an exhaust gas purifying catalyst which has notable effect for exhaust gas containing much oxygen and is excellent in durability.

It is another object of the present invention is to provide an exhaust gas purifying apparatus, which is high in catalyst activity, stable in composition and excellent in durability.

According to the present invention, a brown millerite type composite oxide was used as a catalyst for decomposing and absorbing nitrogen oxide (NOx), and the brown millerite was made to coexist with noble metal salt as a reducing catalyst to thereby realize higher nitrogen oxide (NOx) removing rate than a catalyst used an alkaline earth metal or an oxide or salt of the alkaline earth metal, for example, barium oxide (BaO) which represent of the alkaline earth metal as an nitrogen oxide (NOx) absorbent. Particularly, by adjusting the addition amount of the noble metal (salt) as a reducing catalyst, the catalyst enhance the removing ability of nitrogen oxide (NOx) and the durable service life.

The reason is that the catalyst using the alkaline earth metal, the alkaline metal or rare earth metal such as barium oxide (BaO) removes nitrogen oxide (NO) merely by absorption, whereas the brown millerite has the properties to remove, decompose and adsorb or absorb nitrogen oxide (NOx). That is, since nitrogen oxide (NOx) tends to be adsorbed in the constructive strain such as an oxygen defect derived from conversion of construction under a high temperature and the number of ions in construction tends to change, which are constructive features of the brown millerite, nitrogen oxide (NO) is decomposed into nitrogen and oxygen without using the reducing catalyst. Since the adsorbed nitrogen oxide (NO) by brown millerite as described above is reduced by the reducing catalyst such as Platinum (Pt), the oxygen oxide (NOx) removing rate is further improved.

In case the alkaline earth metal is contained in the brown millerite construction, the characteristic of the alkaline earth metal for adsorbing nitrogen oxide (NOx) is added to the characteristic for removing and decomposing nitrogen oxide (NOx) of the brown millerite, and the nitrogen oxide (NOx) removing rate is further improved. While the basic construction of the brown millerite is established even by two components, the constituent elements (sites) A and C in the general formula described hereinafter, the components of the constituent elements B and D are selected, whereby two times or more nitrogen oxide (NOx) removing rate is obtained by using the same weight of barium oxide (BaO).

In the present invention, at least two kinds of fine noble metal particles are dispersed and fixedly mounted on the surface of brown millerite type composite oxide particles expressed by the general formula, $A_3B_4O_9$, $A_2B_2O_5$ or $AB_2O_4$. The brown millerite type composite oxide includes at least one selected from the group consisting of the following rare earth elements, alkaline earth elements or metal elements, Ce, Nd, Eu, Gd, Tb, Dy, Ho, Er, Ca, Sr, Ba, Ti, Zn, Y, Zr, In and Hf. The noble metal includes at least two selected from the group consisting of Rh, Ru, Au, Pd, Ir and Pt. An average particle diameter of the noble metal particles is less than 25 nm. Two kinds or more of fine noble metal particles as the reducing catalyst are dispersed and fixedly mounted on the surface of the brown millerite type composite oxide particles to thereby widen the active temperature zone as the nitrogen oxide removing catalyst. The noble metal particle itself has the activity and oxidation resistance as an oxidation-reduction catalyst, but is low in reactive activity relative to the constituent element of the brown millerite type composite oxide. Accordingly, the noble metal particles as a catalyst are dispersed on the surface of the brown millerite type composite oxide particles. Further, the noble metal as a catalyst is selected to thereby suppress formation of peroxide and carbonate and suppress decomposition of brown millerite, thus stabilizing the brown millerite to a specific construction of $A_3B_4O_9$, $A_2B_2O_5$, $AB_2O_4$) for a longer service life.

In the exhaust gas purifying catalyst according to the present invention, the noble metal particle functions as a catalyst so as to maintain the construction in which the brown millerite type composite oxide particles exhibits high reactive activity with respect to nitrogen oxide (NO) which is stable in high temperature and to lower the activation energy necessary for phase transition.

In the exhaust gas purifying catalyst according to the present invention, the noble metal reacts with nitrogen oxide (NOx) to act as the reducing catalyst for removing nitrogen oxide (NO) and to stabilize the brown millerite type composite oxide of $A_3B_4O_9$ or $A_2B_2O_5$ phase, and as a result, high nitrogen oxide removing rate and durability are obtained.

The reason why the noble metal stabilizes the brown millerite type composite oxide of $A_3B_4O_9$ or $A_2B_2O_5$ phase is contemplated due to the fact that nitrogen oxide is decomposed by the noble metal, that production of nitric acid group is suppressed, that consumption of adsorbed oxygen is accelerated and that activation energy required for transfer to $A_3B_4O_9$ or $A_2B_2O_5$ phase is lowered by the noble metal catalyst.

The reason why the brown millerite type composite oxide particles exhibits high reactive activity is contemplated due to the fact that the brown millerite type composite oxide of $A_3B_4O_9$ or $A_2B_2O_5$ phase is used and that the noble metal particles are remained in a fine situation to react with nitrogen oxide (NOx). since the noble metal particles fixed on the surface of the brown millerite by heat treatment in a relative low temperature.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

First Embodiment

Figure 1:
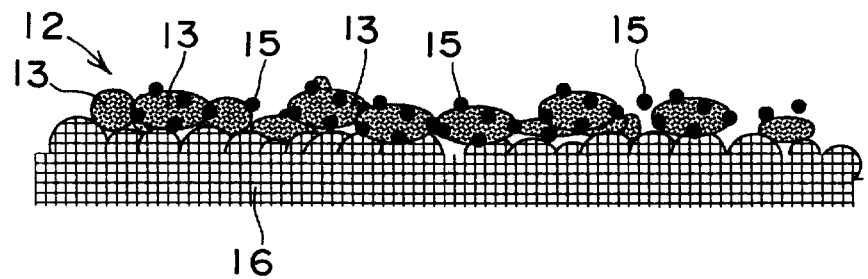
FIG. 1 is a side sectional view schematically showing the composition of the exhaust gas purifying catalyst according to the present invention.

FIG. 1 is a side sectional view schematically showing the composition or tissue of an exhaust gas purifying catalyst according to the present invention. In the exhaust gas purifying catalyst 12 according to the present invention, particles 13 of a catalyst of the brown millerite construction for decomposing and absorbing nitrogen oxide (NOx) and particles 15 of a reducing catalyst of a noble metal series for reducing nitrogen oxide (NOx) are uniformly dispersed and carried on the surface of a honeycomb carrier 16 of cordierite.

According to the present invention, the particles 13 of a composite oxide of a brown millerite type construction are used as a catalyst for decomposing and absorbing nitrogen oxide (NOx), the particles 15 of the noble metal (salt) as a reducing catalyst are adhered and joined to the surface of the particles 13 of a composite oxide of a brown millerite type construction. Particularly, the addition amount of the particles 15 of the noble metal (salt) can be adjusted to thereby enhance the removing ability of nitrogen oxide (NOx) as an exhaust gas purifying catalyst and the durable service life. That is, alkaline earth metal as a constituent ion is selected and added to the particles 13 of the composite oxide of a brown millerite type construction to thereby simultaneously expedite the direct decomposition reaction of nitrogen oxide (NOx) and the adsorption react ion of nitrogen oxide (NOx). With this, the removing ability of nitrogen oxide (NOx) and the durable service life of the the exhaust gas purifying catalyst 12 by the invention can be enhanced as compared with the exhaust gas purifying catalyst using, as an absorbent, a mere alkaline earth metal, oxide of alkaline earth metal, hydroxide of alkaline earth metal, and the like.

The reason why the exhaust gas purifying catalyst of brown millerite type construction exhibits higher nitrogen oxide, removing rate than barium oxide (BaO) as a nitrogen oxide absorbent of a typical alkaline earth metal series is as follows: In the exhaust gas purifying catalyst using alkaline earth metal, alkaline metal, rare earth metal and the like, such as barium oxide (BaO), nitrogen oxide (NOx) is removed by mere absorption, whereas in the exhaust gas purifying catalyst 12 using the composite oxide of brown millerite type construction according to the present invention, it is derived from the conversion of brown millerite type construction under high temperature which is a structural feature. That is, nitrogen oxide (NOx) tends to be adsorbed due to the strain of brown millerite type construction when oxygen is defective. Since the valence of ions in the brown millerite type construction tends to be changed, nitrogen oxide (NOx) is decomposed into nitrogen and oxygen without using the reducing catalyst. Thus, the brown millerite type construction has the characteristics for removing and decomposing nitrogen oxide (NOx).

Further, by adjusting the addition amount of the noble metal (salt), a good arrangement of the noble metal is obtained, and the catalyst ability is enhanced. When the addition amount of the noble metal salt is small, the reception of nitrogen oxide (NOx) from all the brown millerite type construction cannot be managed, and it is not possible to suppress the deterioration of the catalyst ability of the brown millerite type construction in use for a long period. Conversely, when the addition amount of the noble metal salt is large, an effective surface area of the brown millerite type construction is narrowed by the noble metal salt. Therefore, the nitrogen oxide removing rate lowers, and sintering or solidification occurs in use for a long period, tending to deteriorate the catalyst ability. The large addition amount of the noble metal salt is not preferable in that the product cost increases.

EXAMPLE D1

The raw powder was weighed and mixed evenly so that the composition of the general formula, $Ba_{3-a}Ce_aY_{4-b}Dy_bO_9$ (a=0.03 to 1.5, b=0.04 to 2) is as described above, and sintered under the given conditions to obtain a catalyst powder. A solution of palladium chloride ($PdCl_2$) and alumina ($Al_2O_3$) powder were added to the obtained the catalyst powder, which were mixed to prepare a slurry. The slurry was carried on the surface of a honeycomb carrier of cordierite to obtain the exhaust gas purifying catalyst D1.

EXAMPLE D2

The raw powder was weighed and mixed uniformly so that the composition of the general formula, $Sr_{3-a}Ce_aNd_{4-b}Zr_bO_9$ (a=0.03 to 1.5, b=0.04 to 2) is as described above, and sintered at a fixed temperature to obtain a catalyst powder. A solution of palladium chloride ($PdCl_2$) and alumina ($Al_2O_3$) powder were mixed into the obtained catalyst powder to prepare a slurry, and the slurry was carried on the surface of a honeycomb carrier of cordierite to obtain the exhaust gas purifying catalyst D2.

It has been confirmed by X-ray diffraction (XRD) that the particles 4 of the exhaust gas purifying catalysts D1 and D2 according to the invention are the composite oxide having the brown millerite construction.

COMPARATIVE EXAMPLE R1

As a comparative example, a solution of barium nitrate [Ba ($NO_3)_2$] and palladium chloride ($PdCl_2$) were coated on the surface of a honeycomb carrier of cordierite using alumina ($Al_2O_3$) to prepare the exhaust gas purifying catalyst R1 carrying metals of Barium (Ba) and Palladium (Pd).

The performance test was conducted in which two kinds of simulation gases G1 and G2 as shown in Table 1 supposing the using conditions of the lean-burn internal combustion engine are reacted with the exhaust gas purifying catalysts D1 and D2 according to the present invention, alternately for two minutes at a catalyst inlet temperature of 200 to 600° C. and at SV (Space velocity) of 100,000/h. Then, the durable test was carried out In which the simulation gases G1 and G2 at a temperature of 800° C. are reacted with the exhaust gas purifying catalysts D1 and D2 for 30 hours, and thereafter, the above-described performance test was repeated.

TABLE 1

SIMULATION GASES (BALANCE GAS: NITROGEN)

| COMPONENT | NO | OXYGEN | ETHANE | CO | VAPOR | $CO_2$ |
|---|---|---|---|---|---|---|
| G1 | 80 ppm | 0.5% | 2000 ppm | 0.5% | 10% | 14.5% |
| G2 | 800 ppm | 5% | 500 ppm | 0.1% | 10% | 13% |

Catalyst inlet temperature: 200 to 600° C. SV: 100,000/h

Figure 2:
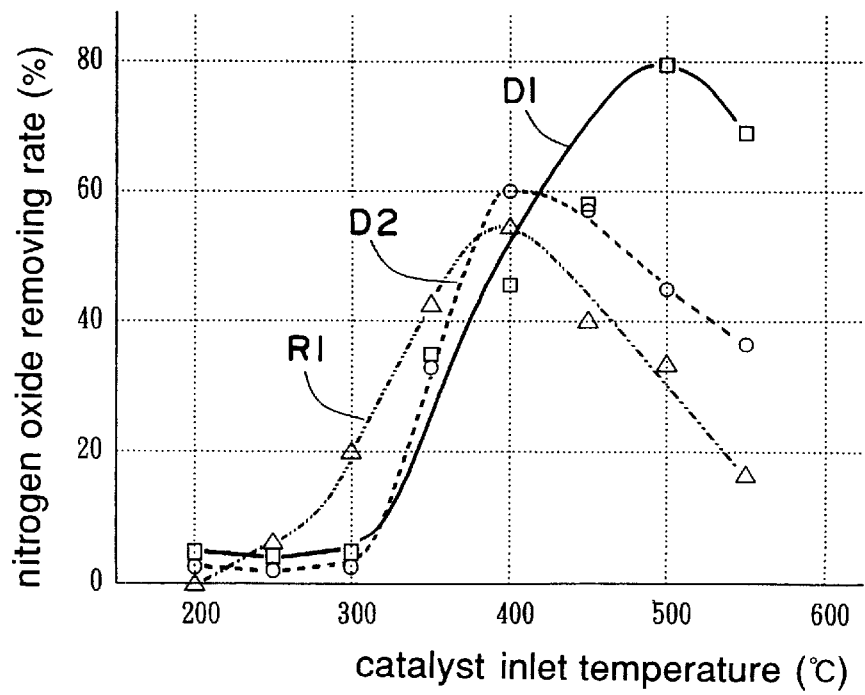
FIG. 2 is a diagram representative of the results of the performance test of the exhaust gas purifying catalyst according to the present invention.
Figure 3:
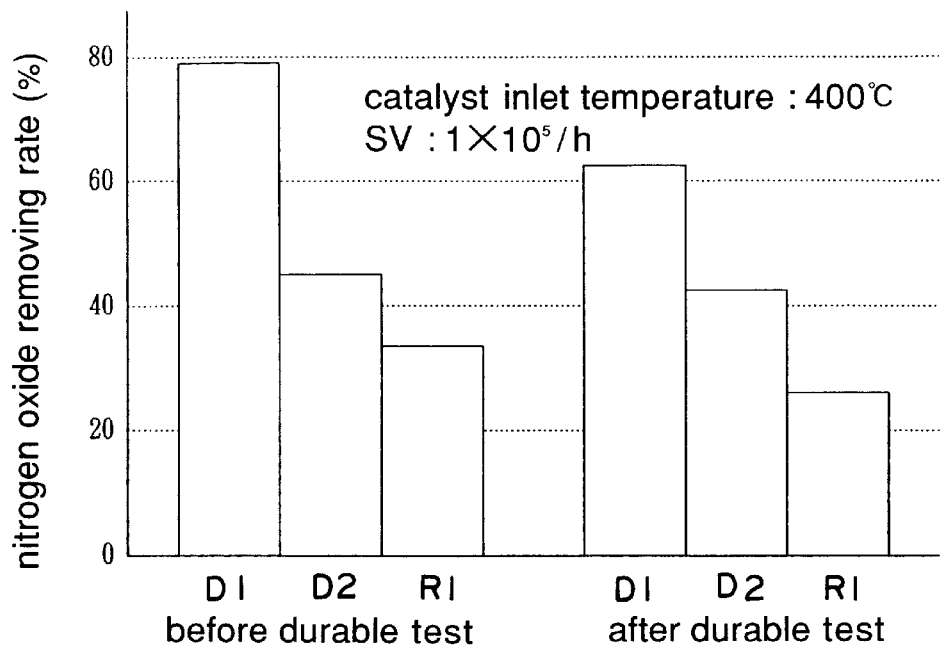
FIG. 3 is a diagram representative of the results of the durable test of the exhaust gas purifying catalyst according to the present invention.

It has been found from the results of the aforementioned performance tests that the exhaust gas purifying catalysts D1 and D2 have high nitrogen oxide (NO) removing rate as compared with the comparative example R1, as shown in FIG. 2, and particularly, the initial nitrogen oxide (NO) removing rate exceeds 50% at temperatures of 350 to 550° C. FIG. 3 shows the nitrogen oxide (NO) removing rate before and after the aforementioned durable test at 400° C. of the catalyst inlet temperature. The exhaust gas purifying catalyst D1 showed high nitrogen oxide (NO) removing rate also after the durable test similarly to that before the durable test.

Figure 4:
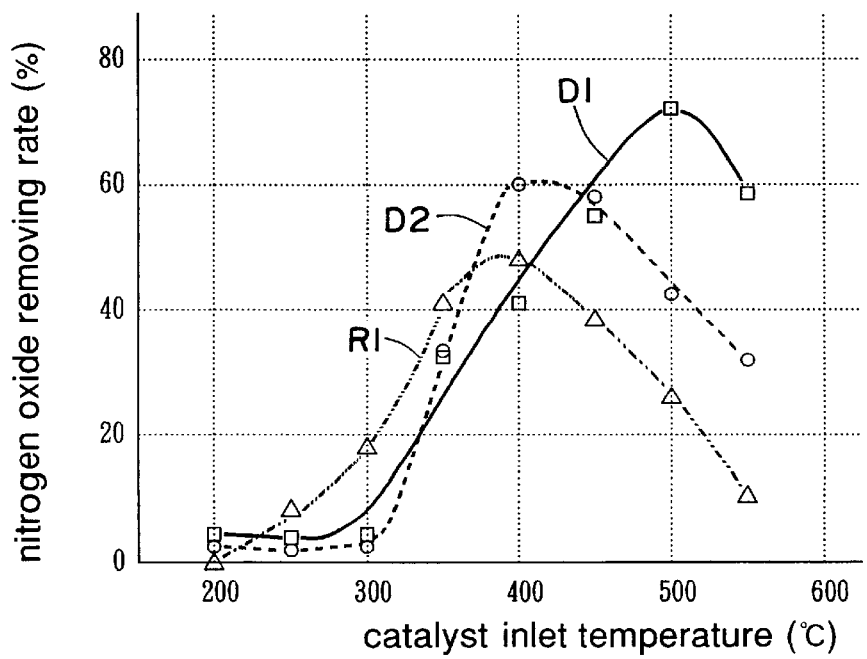
FIG. 4 is a diagram representative of the results of the durable test of the exhaust gas purifying catalyst according to the present invention.

For examining the nitrogen oxide (NOx) removing ability of the exhaust gas purifying catalysts D1 and D2 with the actual exhaust gas of the internal combustion engine, the performance test of the exhaust gas purifying catalysts was conducted using the lean-burn internal combustion engine in displacement of 1.6 liter. The test was alternately repetitiously conducted at intervals of 2 minutes in operation at theoretic air-fuel ratio and oxygen surplus air-fuel ratio in the internal combustion engine bench. FIG. 4 shows the results of the test. It is found that the exhaust gas purifying catalysts D1 and D2 have high nitrogen oxide (NOx) removing rate as compared with the comparative example R1.

Besides the exhaust gas purifying catalysts D1 and D2 by the present invention, the test similar to the above was conducted also with respect to the exhaust gas purifying catalyst (specimen) using elements shown in Table 2 as constituent elements A to D in the general formula, $A_{3-a}B_aC_{4-b}D_bO_9$, $A_{2-a}B_aC_{2-b}D_bO_5$ and $A_{1-a}B_aC_{2-b}D_bO_4$ and elements shown in Table 3 as reducing catalysts and good results similar to the above were obtained.

Table 2

Constituent elements A, B: Barium (Ba), Calcium (Ca), Strontium (Sr), Magnesium (Mg), Cerium (Ce)

Constituent elements C, D: Yttrium (Y), Dysprosium (Dy), Zinc (Zn), Titanium (Ti), Manganese (mn), iron (Fe), Cobalt (Co), Nickel (Ni), Copper (Cu), Tin (Sn), Zirconium (Zr) Neodymium (Nd)

Table 3

Reducing catalyst: Platinum (Pt), Palladium (Pd), Iridium (Ir), Rhodium (Rh)., Ruthenium (Ru), Gold (AU)

Second Embodiment

Figure 5:
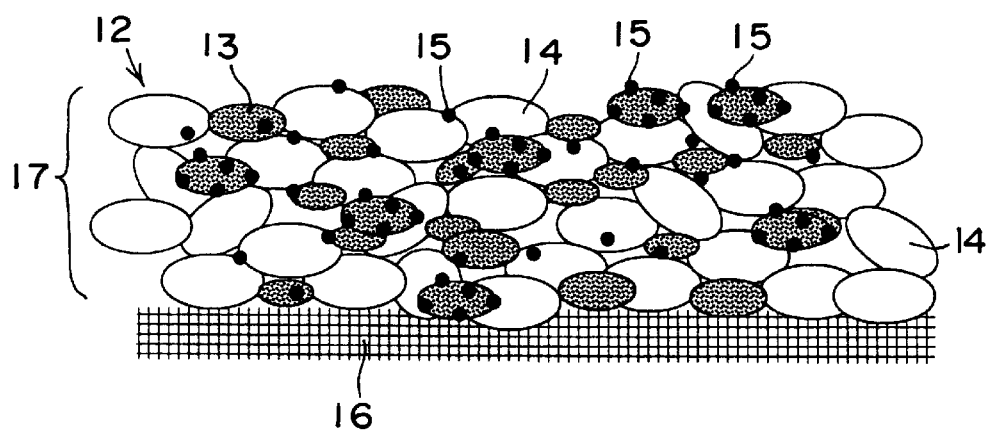
FIG. 5 is a side sectional view schematically showing the composition of an exhaust gas purifying catalyst according to the second embodiment of the present invention.

FIG. 5 is a side sectional view schematically showing the composition of an exhaust gas purifying catalyst according to the present invention. In the exhaust gas purifying catalyst 12 according to the present invention, a wash coat layer or a porous layer 17 having a thickness of approximately a few to scores of $\mu m$ is joined to the surface of a honeycomb carrier 16 of cordierite. The porous layer 17 is formed by a mixture of particles 13 of a composite oxide of a brown millerite type construction having approximately 1 to 10 $\mu m$ of particle size for decomposing and absorbing nitrogen oxide (NOx) and carrier particles 14 such as alumina ($Al_2O_3$) having rugged portions on the surface thereof. Particles 15 of the noble metal (or salt thereof) such as Gold (Au), Silver (Ag), Platinum (Pt), Iridium (Ir), Rhodium (Rh), Palladium (Pd) and Ruthenium (Ru) having less than approximately 1 $\mu m$ of particle size as a reduction catalyst for reducing nitrogen oxide (NOx) are even ly dispersed and carried on the surfaces of the particles 13 of the composite oxide of the brown millerite type construction and the carrier particles 14. The amount of fine particles of the noble metal or salt of the noble metal is preferably the amount corresponding to 20 to 200 mol. % of the particles 13 of the composite oxide of the brown millerite type construction, preferably, 25 to 200 mol. % of the particles 13 of the composite oxide of the brown millerite type construction.

EXAMPLE D3

Barium (Ba), Cerium (Ce), Yttrium (Y) and Dysprosium (Dy) as raw powder were scaled so as to have the composition $Ba_{2.85}Ce_{0.15}Y_{3.8}Dy_{0.2}O_9$ such that ea is 2.85, Ce is 0.15, Y is 3.8 and Dy is 0.209, and were evenly mixed and sintered under the given conditions to obtain a powder of a composite oxide of brown millerite type construction. A rhodium nitrate solution was added to the obtained powder of the composite oxide of brown millerite type construction, and then mixed to prepare a slurry. After the slurry has been dried, it was heat-treated under the given conditions to obtain a specimen powder as the exhaust gas purifying catalyst D3 according to the present invention. As the result of analysis of the exhaust gas purifying catalyst D3 by an X-ray diffraction device, it has been confirmed that the exhaust gas purifying catalyst D3 was a composite oxide of brown millerite type construction.

COMPARATIVE EXAMPLE R2

On the other hand, as a comparative example, a powder of a composite oxide of brown millerite type construction without adding a rhodium nitrate $[Rh(NO_3)_3]$ solution was used for the performance test and the durability test as follows:

In order to confirm the exhaust gas purifying performances of the exhaust gas purifying catalyst D3 and the aforementioned comparative example R2, the simulation or mimic gases G1 and G2 at a temperature of 400 to 800° C. as shown in Table 1 supposing the using conditions of the lean-burn internal combustion engine were alternately reacted at intervals of two minutes with the exhaust gas purifying catalyst D3 and the aforementioned comparative example R2.

Further, in order to confirm the durability performances of the exhaust gas purifying catalyst D3 and the aforementioned comparative example R2, the durability test was carried out continuously for 100 hours in which the mimic gases G1 and G2 at a temperature of 700° C. were alternately reacted at intervals of two minutes with the exhaust gas purifying catalyst D3 and the aforementioned comparative example R2.

It has been found from the result of the performance test in case temperatures of the mimic gases G1 and G2 are variously changed that the exhaust gas purifying catalyst D3 shows high nitrogen oxide removing rate as compared with the comparative example R2, and particularly the initial nitrogen oxide removing rate, due to the parformance of the composite oxide of brown millerite type construction, exceeds 50% at a temperature of 350 to 550° C. even the addition amount of the noble metal is less than 20 mol. %.

Figure 6:
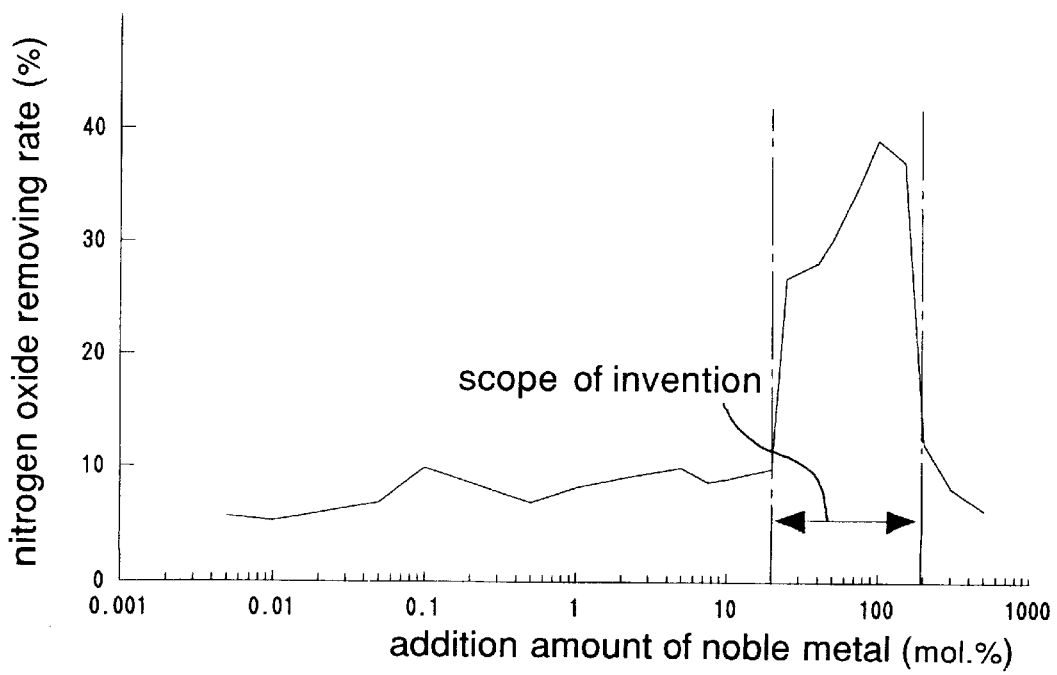
FIG. 6 is a diagram representative of the result of the performance test of the exhaust gas purifying catalyst according to the present invention.

FIG. 6 shows the initial nitrogen oxide removing rate when the performance test is carried out in which the mimic gases G1 and G2 at a temperature of 400° C. are alternately reacted with the exhaust gas purifying catalyst D3 at a space velocity (SV) of 100.000/h. When the temperature of the mimic gases G1 and G2 at the inlet of the exhaust gas purifying catalyst D3 is 400° C. and the addition amount of the noble metal as a reducing catalyst is 20 to 200 mol. %, the nitrogen oxide removing rate is 35 to 45%. The exhaust gas purifying catalyst D3 showed high nitrogen oxide removing rate similar to that before the durability test even aft er the durability test.

In the aforementioned embodiments, the noble metal catalyst shown in Table 4 was used as a reducing catalyst, in place of Rhodium (Rh), to prepare the exhaust gas purifying catalyst. That is, the noble metal salt solutions, respectively, were added to and mixed with the powder of the composite oxide of brown millerite type construction to prepare a slurry. After the slurry has been dried, the heat treatment was carried out to the dried slur ry under the given conditions to obtain a specimen powder as the exhaust gas purifying catalyst according to the present invention. With respect to the exhaust gas purifying catalyst using the aforesaid specimen powder, the aforementioned performance test and durability test were carried out, then the good results similar to FIRST EMBODIMENT was obtained.

Table 4

Metals used for noble metal catalyst; Gold (Au), Platinum (Pt), Iridium (Ir), Rhodium (Rh), Palladium (Pd)

Third Embodiment

The brown millerite whose composition is expressed by $Ba_{3-a}Sr_aY_{4-b}Zr_bO_9$ (a=0 to 0.6, b=0 to 0.8) is synthesized and crushed into powder. The brown millerite powder was added to and mixed with the noble metal salt solution so that the mixing ratio between the brown millerite and the noble metal is 2:1 to 2 in mole ratio, to prepare a slurry. As the noble metal, a mixture of Rhodium (Rh), Ruthenium (Ru) and Platinum (Pt) In the range of 0 to 90 wt. % was used. After the obtained slurry has been dried, beat treatment was carried out at a temperature of 500 to 1100° C. to obtain the exhaust gas purifying catalyst according to the present invention.

As a result of observation of by a scan type electronic microscope and a transmission type electronic microscope, it has been found that the exhaust gas purifying catalyst according to the present invention is such constructed that the noble metal particles of 2 to 80 nm were dispersed and joined to the surface of the primary particles of the brown millerite whose particle size is few or scores of $\mu$m. It has been also found that the shape and the particle diameter of the brown millerite particles constituting the exhaust gas purifying catalyst by the present invention were largely changed according to the conditions of heat treatment and activation.

EXAMPLE A1

As a concrete example, an exhaust gas purifying catalyst A1 was prepared by adding the noble metal comprising Rhodium (Rh), Ruthenium (Ru) and Platinum (Pt) in the rate of 50 wt. %, 25 wt. % and 25 wt. %, respectively, in the aforementioned method, to the brown millerite whose composition is expressed by $Ba_{2.97}Sr_{0.03}Y_{3.8}Zr_{0.2}O_9$.

COMPARATIVE EXAMPLE R4 to R6

As comparative examples, exhaust gas purifying catalysts R4 and R5 were prepared by singly adding the noble metals of Rhodium (Rh) and Platinum (Pt), respectively, to the brown millerite whose composition is expressed by $Ba_{3-a}Sr_aY_{4-b}Zr_bO_9$ (a=0 to 0.6, b=0 to 0.8), and an exhaust gas purifying catalyst R6 was prepared without addition of the noble metal to the brown millerite.

With respect to the exhaust gas purifying catalyst A1 and the exhaust gas purifying catalyst R4 to R6 according to the comparative examples, the test for removing nitrogen oxide was conducted under the condition of space velocity (SV) 100,000/h using a mimic gas comprising 400 ppm of nitrogen oxide, 500 ppm of ethane, 10 vol. % of oxygen, and the remainder of nitrogen (balance gas). The results was then obtained as shown in FIG. 7.

Figure 7:
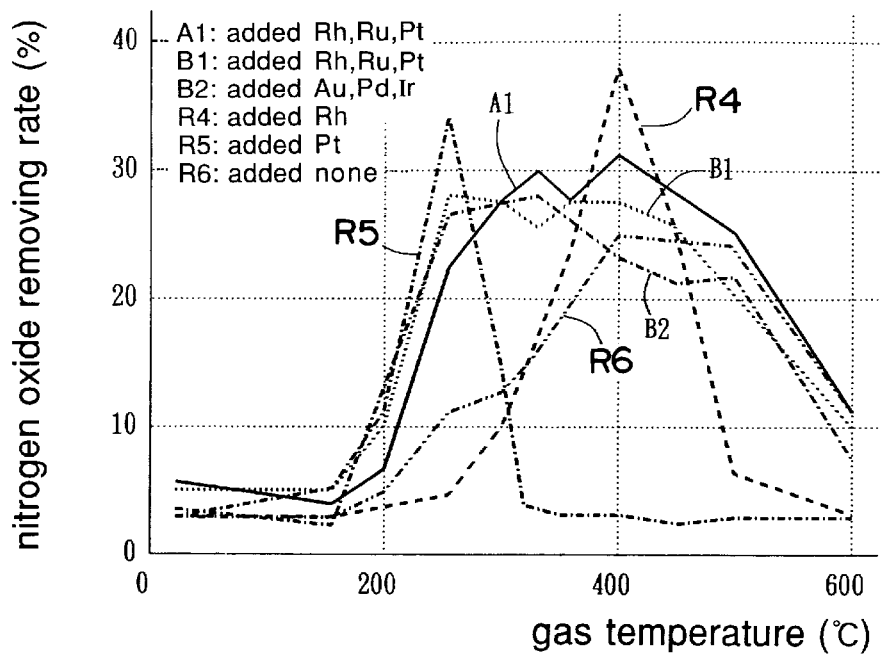
FIG. 7 is a diagram representative of a relationship between an exhaust gas temperature and a nitrogen oxide removing rate with respect to an exhaust gas purifying catalyst according to the third embodiment of the present invention and the comparative examples.

As will be apparent from FIG. 7, it has been found that the exhaust gas purifying catalyst A1 showed high nitrogen oxide removing rate at the wide activity temperature zone as compared with the exhaust gas purifying catalyst R4 to R6 according to the comparative examples.

EXAMPLE B1

Further, in the aforementioned example of the present invention, with respect to an exhaust gas purifying catalyst B1 prepared by mixing Rhodium (Rh), Ruthenium (Ru) and Platinum (Pt) as the noble metal which were changed in the mixing rate, in the aforementioned method, into the brown millerite whose composition is expressed by $Ba_{2.97}Sr_{0.03}Y_{3.8}Zr_{0.2}O_9$, the test for removing nitrogen oxide was conducted in a manner similar to the above it has been found that high nitrogen oxide removing rate characteristic was exhibited in the wide activity temperature zone though there is a slight difference in activity temperature zone.

EXAMPLE B2

Further, in the aforementioned example of the present invention, with respect to an exhaust gas purifying catalyst B2 prepared by adding Gold (Au), Palladium (Pd) and Iridium (Ir) as the noble metal, in the aforementioned method, to the brown millerite whose composition is expressed by $Ba_{2.97}Sr_{0.03}Y_{3.8}Zr_{0.2}O_9$, the test for removing nitrogen oxide was conducted in a manner similar to the above. It has been found that high nitrogen oxide removing rate characteristic was exhibited in the wide activity temperature zone though there is a slight difference in activity temperature zone.

Figure 8:
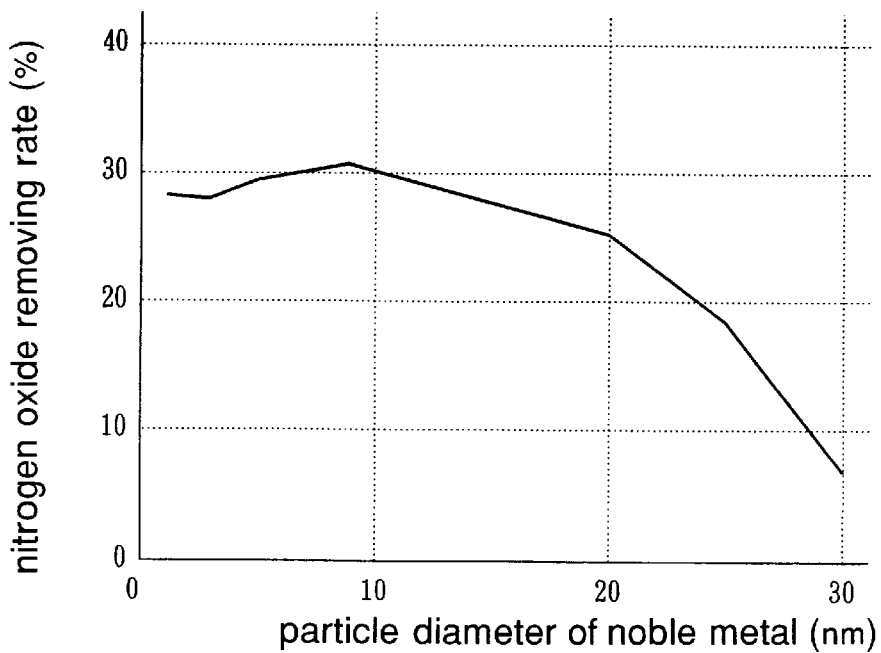
FIG. 8 is a diagram representative of a relationship between a particle diameter of the noble metal particles and a nitrogen oxide removing rate with respect to the exhaust gas purifying catalyst according to the third embodiment of the present invention.

Furthermore, in the aforementioned example of the present invention, with respect to the exhaust gas purifying catalyst A1 prepared by adding the noble metal comprising Rhodium (Rh), Ruthenium (Ru) and Platinum (Pt) in the rate of 50 wt. %, 25 wt. % and 25 wt. %, respectively, in the aforementioned method, to the brown millerite whose composition is expressed by $Ba_{2.97}Sr_{0.03}Y_{3.8}Zr_{0.2}O_9$ wherein the heat treatment conditions and the activation processing conditions are changed and the particle diameter of the noble metal particles is changed, the test for removing nitrogen oxide was conducted under the condition of space velocity (SV) 100,000/h using a mimic gas comprising 400 ppm of nitrogen oxide, 500 ppm of ethane, 10 vol. % of oxygen and the remainder of nitrogen (balance gas, approximately 90 vol. %). The results was then obtained as shown in FIG. 8. As will be apparent from FIG. 8, it has been found that in the exhaust gas purifying catalyst A1, the particle diameter of the noble metal particles greatly influences on the nitrogen oxide removing rate.

Fourth Embodiment

Figure 9:
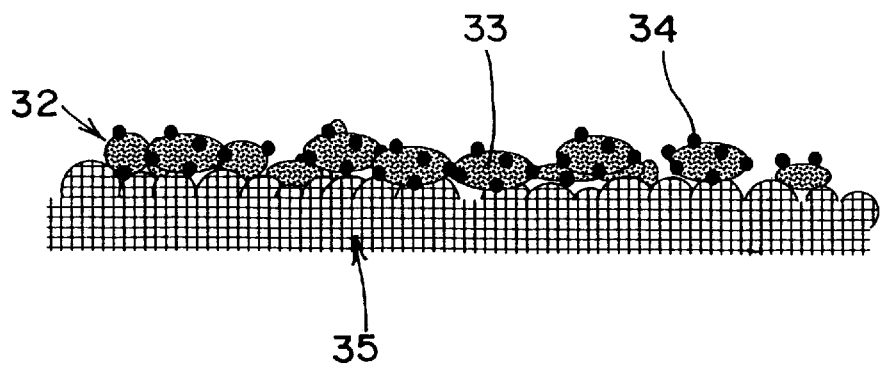
FIG. 9 is a side sectional view schematically showing the composition of an exhaust gas purifying catalyst according to the fourth embodiment of the present invention.

As shown in FIG. 9, the exhaust gas purifying catalyst 32 according to the present invention comprises nitrogen oxide absorbing and decomposing catalyst particles 33 formed of the brown millerite type composite oxide represented by the general formula $A_2B_2O_5$ having at least two selected from the group consisting of Barium (Ba), Yttrium (Y), Strontium (Sr), Calcium (Ca), Titanium (Ti), Cerium (Ce), Zirconium (Zr) and Germanium (Ge) as constituent elements A and B and fine reducing catalyst 34 particles formed of the noble metal, and they are arranged in the same layer on the surface of a heat resistant honeycomb carrier 35. The noble metal particles 34 are dispersed and fixed on the surface of the particles 33 of the composite oxide of brown millerite costruction.

The noble metal particles 34 is selected at least one from the group consisting of Rhodium (Rh), Ruthenium (Ru), Palladium (Pd), Iridium (Ir), Platinum (Pt) and Gold (Au). The quantity of the noble metal particles 34 is 20 to 200 mol. % in the mole ratio with respect to the brown millerite type composite oxide particles 33. The honeycomb carrier 35 is one selected from the group consisting of cordierite, alumina ($Al_2O_3$), silicon carbide (SiC) and nickel series heat resistant alloy.

EXAMPLE E1

The brown millerite type composite oxide of which composition is represented by the general formula $Ba_{2-a}Sr_aY_{2-b}Zr_bO_5$ (a=0 to 0.6, b=0 to 0.6) was synthesized and then pulverized, and the brown millerite type composite oxide powder was mixed with a solution of the noble metal salt so that the mole ratio of Rhodium (Rh) is 0.005 to 500 mol.% with respect to the brown millerite type composite oxide to prepare a slurry. The honeycomb carrier [400 cpi (having a cell of 400/sq.inch), 4 mil] 35 formed of cordierite was dipped into the slurry, the slurry was adhered to the honeycomb carrier 35, and the extra slurry was wiped away, after which it was dried at 70° C. Then, the honeycomb carrier 35 was subjected to heat treatment for 1 to 4 hours at temperature of 500 to 1100° C. to obtain the exhaust gas purifying catalyst E1 according to the present invention. It has been found from observation by the scan type electronic microscope (SEM) and a transmission type electronic microscope (TEM) that the noble metal particles 34 of a few nm to scores of nm are dispersed on the surface of the primary particles 33 of the brown millerite type composite oxide of sub micron to a few micron in the exhaust gas purifying catalyst E1 which is adhered on the surface of the honeycomb carrier 35.

COMPARATIVE EXAMPLE R7

As a comparative example, the exhaust gas purifying catalyst having Rhodium (Rh) added to the brown millerite type composite oxide of $A_3B_4O_9$ phase was prepared in the procedure similar to the above-described exmaple E1. The exhaust gas purifying catalyst was carried on the honeycomb carrier.

[Nitrogen Oxide Removing Test]

With respect to the exhaust gas purifying catalyst E1 and the comparative example R7, respectively, the removing test for nitrogen oxide (NOx) was conducted. In the removing test, the continuous test and the discontinuous test were conducted using a simulation or mimic gas comprising 400 ppm of nitrogen oxide (NO), 500 ppm of ethane, 10 vol. % of oxygen, and about 90 vol. % of balance gas of Nitrogen ($N_2$). In the continuous test, the simulation gas at a temperature of 400° C. was continuously supplied for 200 hours at space speed of 100,000/h to the respective exhaust gas purifying catalyst E1 and the comparative example R7. In the discontinuous test, the simulation gas at a temperature of 400° C. was supplied for 21 hours at space speed of 100,000/h to the respective exhaust gas purifying catalyst E1 and the comparative example R7 and after this a supply of the simulation gas was discontinued for 3 hours. In this method, heating and cooling of the exhaust gas purifying catalyst E1 and comparative example R7 were repeated.

Figure 10:
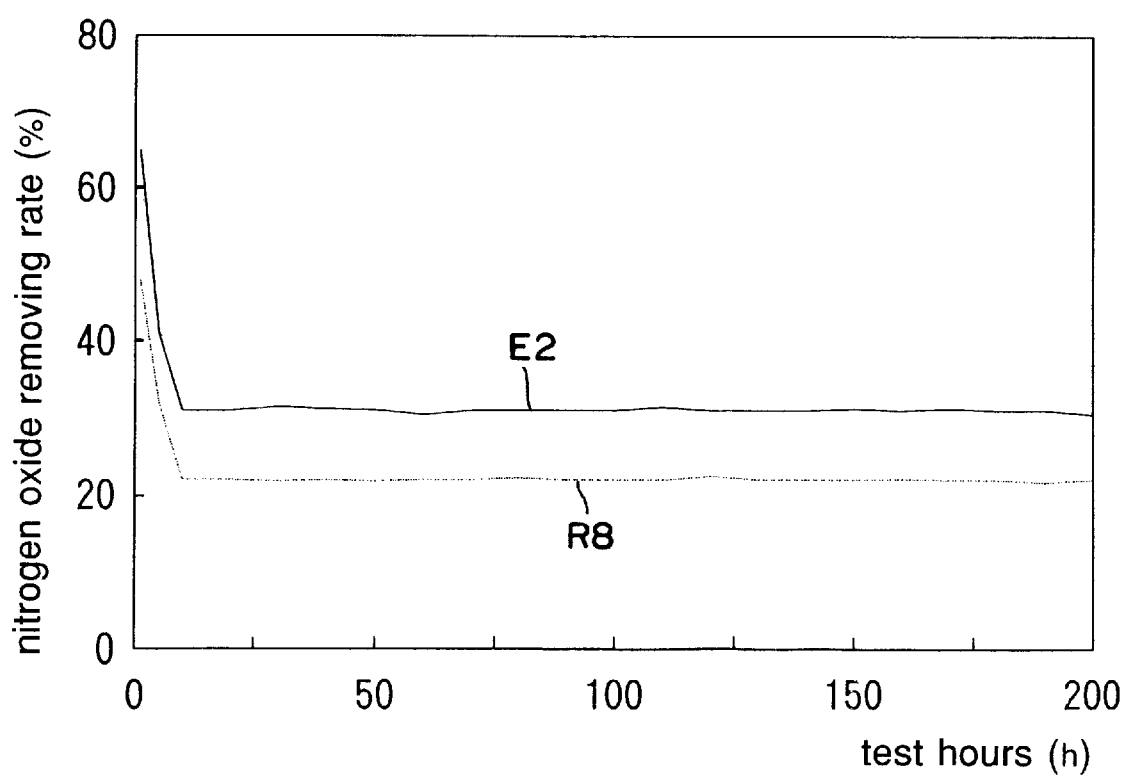
FIG. 10 is a diagram representative of the nitrogen oxide removing characteristics with respect to a continuous operation of the exhaust gas purifying catalyst according to the present invention and the comparative example.

FIG. 10 represents the results of the continuous operation test for the exhaust gas purifying catalyst E2 added the equal mole of Rhodium (Rh) to the brown millerite type composite oxide expressed by $Ba_{1.98}Sr_{0.02}Y_{1.9}Zr_{0.1}O_5$ and the exhaust gas purifying catalyst R8 added Rhodium (Rh) to the brown millerite type composite oxide expressed by $A_3B_4O_9$ phase.

Figure 11:
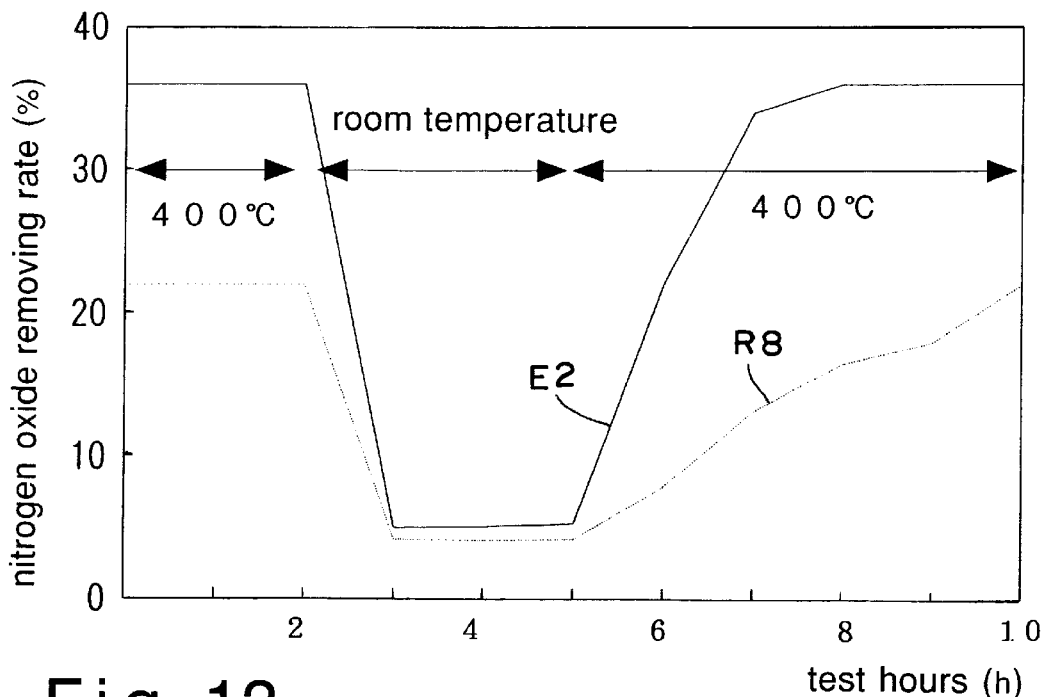
FIG. 11 is a diagram representative of the nitrogen oxide removing characteristics with respect to a discontinuous operation of the exhaust gas purifying catalyst according to the present invention and the comparative example.

FIG. 11 represents the results of the discontinuous operation test for the exhaust gas purifying catalyst E2 added the equal mole of Rhodium (Rh) to the brown millerite type composite oxide expressed by $Ba_{1.98}Sr_{0.02}Y_{1.9}Zr_{0.1}O_5$ and the exhaust gas purifying catalyst R8 added Rhodium (Rh) to the brown millerite type composite oxide expressed by $A_3B_4O_9$ phase.

As will be apparent from FIG. 10, it is found that the exhaust gas purifying catalyst E2 shows higher removing rate of nitrogen oxide than that of the exhaust gas purifying catalyst E1S through the entire operation time. Further, as will be apparent from FIG. 11 it is found that the exhaust gas purifying catalyst E2 is quicker in recovery of the removing performance of nitrogen oxide when the operation test restarts after discontinuation of the operation test than that of the exhaust gas purifying catalyst R8.

When the operation test for the exhaust gas purifying catalyst R8 discontinues, the temperature of the brown millerite type composite oxide of $A_2B_2O_5$ phase lowers, and the catalyst activity thereof lowers. When the operation test restarts, the brown millerite type composite oxide is heated, the nitrogen oxide (NO) having been adsorbed in the brown millerite type composite oxide is decomposed and released in a short period of time to restore the catalyst activity of the brown millerite type composite oxide. The exhaust gas purifying catalyst E2 uses the brown millerite type composite oxide of $A_2B_2O_5$ phase, and the time at which the catalyst activity of the brown millerite type composite oxide of $A_2B_2O_5$ phase is restored is shorter than that of the brown millerite type composite oxide of $A_3B_4O_9$ phase.

Figure 12:
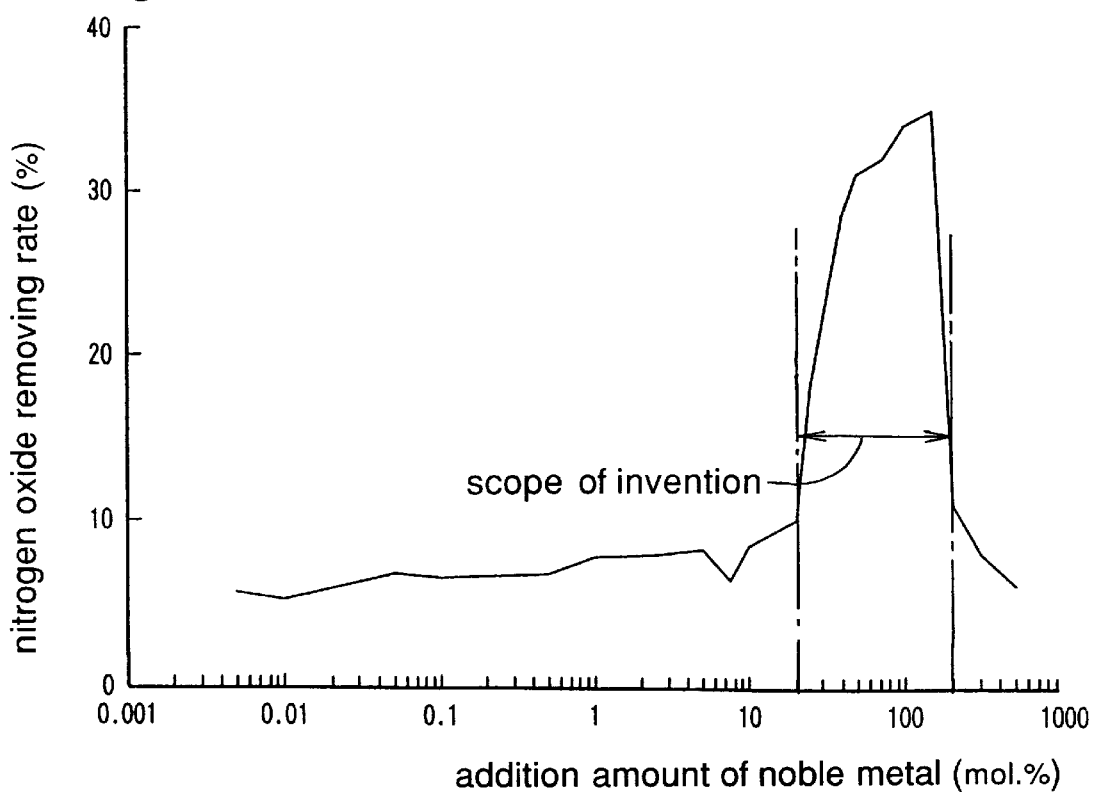
FIG. 12 is a diagram showing a relationship between the addition amount of the noble metal particles used in the exhaust gas purifying catalyst according to the present invention and the nitrogen oxide removing characteristics.

For confirming a relationship between the addition amount of the noble metal particles 34 and the nitrogen oxide removing effect in the exhaust gas purifying catalysts E1 and E2, the durable test of the exhaust gas purifying catalysts E1 and E2 were conducted. The durable test is conducted to examine the nitrogen oxide removing characteristics after conduction of the nitrogen oxide removing test for 500 hours under the same conditions as those of the aforementioned continuous operation test. As will be apparent from FIG. 12, in the exhaust gas purifying catalysts E1 and E2, the removing characteristics of nitrogen oxide (NO) greatly changes depending on the addition amount of the noble metal particles 34 in the exhaust gas purifying catalyst 32, and the suitable addition amount of the noble metal particles 34 is 20 to 200 mol. % in mole ratio with respect to the brown millerite type composite oxide particles 33.

With respect to the exhaust gas purifying catalysts E1 and E2 in which as the constituent element A of the exhaust gas purifying catalysts E1 and E2, Cerium (Ce) and Calcium (Ca) are used in place of Strontium (Sr), respectively; as the constituent element B, Titanium (Ti) and Germanium (Ge) are used in place of Zirconium (Zr), respectively; and as the noble metal, Ruthenium (Ru), Palladium (Pd), Iridium (Ir), Platinum (Pt) and Gold (Au), respectively are used in place of Rhodium (Rh), the similar test was conducted. The high removing characteristics of nitrogen oxide (NO) was shown similar to the aforementioned examples.

Further, with respect to the exhaust gas purifying catalyst in which the honeycomb carrier 35 comprising alumina, silicon carbide (SiC) and nickel series heat resistant alloy, respectively is used in place of the honeycomb carrier 35 comprising cordierite, the similar test was conducted. The high removing characteristics of nitrogen oxide (NO) was shown similar to the aforementioned examples.

Figure 13:
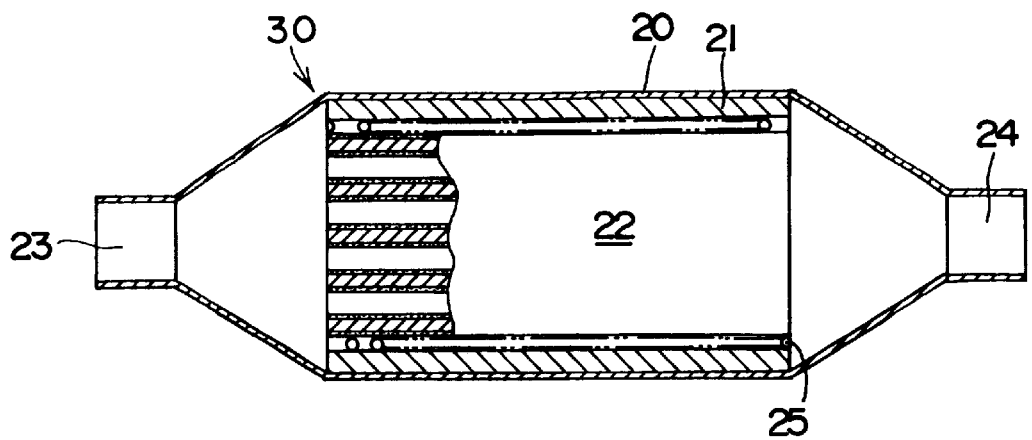
FIG. 13 is a side sectional view showing an exhaust gas purifying apparatus in which the exhaust gas purifying catalyst by the present invention is combined.
Figure 14:
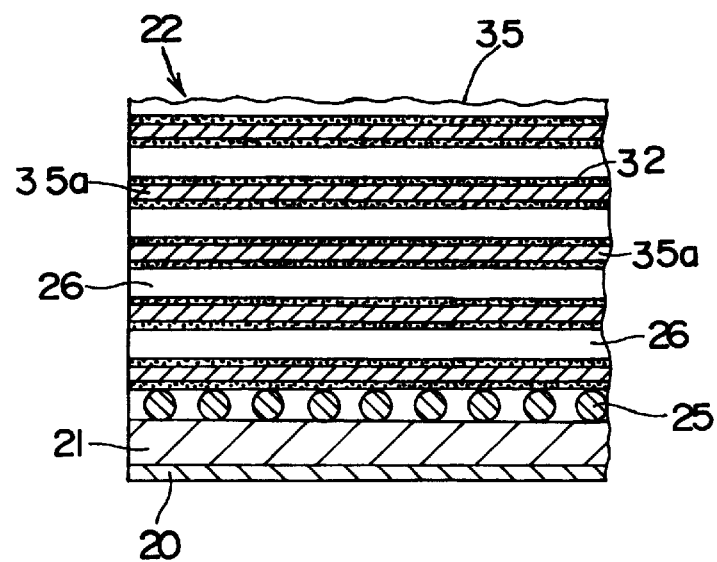
FIG. 14 is a side sectional view showing main parts of the exhaust gas purifying apparatus in an large scale.

The exhaust gas purifying catalyst described above is combined in an exhaust gas purifying apparatus 30, shown in FIG. 13 as an example. The exhaust gas purifying apparatus 30 comprises a case 20 for accommodating an exhaust gas purifying filter 22 covered with a heat insulating member 21. The inlet pipe 23 on one end of the case 20 is connected with an exhaust pipe of the Diesel engine and the outlet pipe 24 on the other end of the case 20 is connected with a silencer. An electric heat wire 25 is coiled on the outer peripheral surface of the filter 22, the electric heat wire 25 functions as a heater when the filter 22 is reproduced. As shown in FIG. 14, the exhaust gas purifying filter 22 comprises a honeycomb carrier 35 made of the nickel series heat resistance alloy or porous ceramic such as cordierite, alumina ($Al_2O_3$), silicon carbide (SiC) and the like. A number of passages 26 passing through the carrier 35 are disposed in the honeycomb carrier 35 and the exhaust gas purifying catalysts 12 or 32 are carried or adhered on the wall of the passages 26.

Applicapability For Industrial Use

A composite oxide of a brown millerite type construction as a catalyst for decomposing and absorbing nitrogen oxide (NOx) and the noble metal salt as a reducing catalyst are made to coexist. With this, it is possible to realize a higher nitrogen oxide removing rate than an exhaust gas purifying catalyst used alkaline earth metal, oxide of alkaline earth metal or salt of alkaline earth metal for absorbing nitrogen oxide (NO), for example, barium oxide (BaO). Particularly, the addition amount of the noble metal (or salt) as a reducing catalyst can be adjusted to thereby enhance the removing ability of nitrogen oxide (NOx) and the durable service life as a catalyst.

Effect of the Invention

Since nitrogen oxide (NOx) decomposed and adsorbed by the brown millerite type composite oxide is reduced by the reducing catalyst such as the noble metal, the exhaust gas purifying catalyst by the present invention enhance higher exhaust gas purifying rate and service life than the catalyst merely used alkaline earth metal, alkaline metal, rare earth element metal and salt or oxide thereof.

Nitrogen oxide (NOx) is decomposed and adsorbed by the composite oxide of brown millerite type construction, and the adsorbed nitrogen oxide (NOx) is reduced and decomposed by the noble metal. Particularly, high exhaust gas purifying rate and long durable service life can be obtained by adjusting the addition amount of the noble metal powder and the dispersed state of the noble metal powder as a reducing catalyst.

Since at least two kinds of fine noble metal particles are dispersed and fixedly mounted on the surface of brown millerite type composite oxide particles expressed by $A_3B_4O_9$ or $A_2B_2O_5$, the catalyst activity temperature window can be widened and the durability of the exhaust gas purifying catalyst can be enhanced.

Obviously, many modifications and variations of the present invention are possible in right of the above teachings. It is to be understood, therefore, that the invention can be practiced otherwise than as specifically described.

What is claimed is:

1. An exhaust gas purifying catalyst for use in an oxygen surplus atmosphere, comprising:
   a brown millerite composite oxide for directly decomposing and absorbing nitrogen oxide ($NO_x$), and
   a noble metal-series reducing catalyst disposed on the surface of said brown millerite composite oxide, the brown millerite composite oxide being represented by one of the following formulae:

$A_{3-a}B_aC_{4-b}D_bO_9$, $A_{2-a}B_aC_{2-b}D_bO_5$, and $A_{1-a}B_aC_{2-b}D_bO_4$ where A and B are elements selected from the group consisting of Ba, Ca, Sr, Mg and Ce, C and D are elements selected from the group consisting of Y, Dy, Zn, Ti, Mn, Fe, Co, Ni, Cu, Sn, Zr and Nd, a is within the range $0 \leq a < 1$ and b is within the range $0 \leq b < 2$.

2. An exhaust gas purifying catalyst according to claim 1, wherein said noble metal-series reducing catalyst is at least one element selected from the group consisting of Au, Pt, Ir, Rh, Ru and Pd.

3. An exhaust gas purifying catalyst according to claim 2, wherein
   the brown millerite composite oxide is in the form of particles having a surface,
   the noble metal-series reducing catalyst is in the form of the fine noble metal particles, and
   at least two kinds of fine noble metal particles are dispersed and fixedly mounted on the surface of brown millerite composite oxide particles.

4. An exhaust gas purifying catalyst according to claim 3, wherein an average particle diameter of said fine noble metal particles is less than 25 nm.

5. An exhaust gas purifying catalyst according to claim 2, wherein
   the noble metal-series reducing catalyst is in the form of fine noble metal particles,
   the brown millerite composite oxide is in the form of particles having a particle surface,
   the amount of fine noble metal particles is 20 to 200 mol. % of said brown millerite composite oxide, and
   the fine noble metal particles are dispersed on and adhered to the particle surface of said brown millerite composite oxide.

6. An exhaust gas purifying catalyst according to claim 5, wherein an average particle diameter of said fine noble metal particles is less than 25 nm.

7. An exhaust gas purifying catalyst according to claim 1, wherein said noble metal-series reducing catalyst is at least two elements selected from the group consisting of Au, Pt, Ir, Rh, Ru and Pd.

8. An exhaust gas purifying catalyst according to claim 7, wherein
   the noble metal-series reducing catalyst is in the form of fine noble metal particles,
   the brown millerite composite oxide is in the form of particles having a surface,
   at least two kinds of fine noble metal particles are dispersed and fixedly mounted on the surface of brown millerite composite oxide particles.

9. An exhaust gas purifying catalyst according to claim 7, wherein
   the noble metal-series reducing catalyst is in the form of fine noble metal particles,
   the brown millerite composite oxide is in the form of particles having a surface,
   the amount of fine noble metal particles is 20 to 200 mol. % of said brown millerite composite oxide, and
   the fine noble metal particles are dispersed on and adhered to the particle surface of said brown millerite composite oxide.

10. An exhaust gas purifying catalyst according to claim 1, wherein
    the noble metal-series reducing catalyst is in the form of fine particles,
    the brown millerite composite oxide is in the form of particles, and
    the particles of said brown millerite composite oxide and the fine particles of said noble metal-series reducing catalyst are disposed in the same surface layer of a heat resistant carrier.

11. An exhaust gas purifying catalyst according to claim 10, wherein said heat resistant carrier is at least one carrier selected from the group consisting of alumina ($Al_2O_3$), silicon carbide (SiC) and a nickel series heat resistant alloy.

12. An exhaust gas purifying catalyst according to claim 1, wherein a is within the range $0 \leq a < 0.6$ and b is within the range $0 \leq b < 0.8$.

13. An exhaust gas purifying catalyst according to claim 1, wherein A is Ba, B is Sr, C is Y and D is Zr.

14. An exhaust gas purifying catalyst according to claim 13, wherein a is within the range $0 \leq a < 0.6$ and b is within the range $0 \leq b < 0.8$.

15. An exhaust gas purifying catalyst according to claim 1, wherein A is Ba, B is Ce, C is Y and D is Dy.

16. An exhaust gas purifying catalyst for use in an oxygen surplus atmosphere, comprising:
    a brown millerite composite oxide for directly decomposing and absorbing nitrogen oxide ($NO_x$), and
    a noble metal-series reducing catalyst disposed on the surface of said brown millerite composite oxide, the brown millerite composite oxide being represented by one of the following formulae:

$A_{3-a}B_aC_{4-b}D_bO_9$, $A_{2-a}B_aC_{2-b}D_bO_5$, and $A_{1-a}B_aC_{2-b}D_bO_4$ where A and B are elements selected from the group consisting of Ba, Ca, Sr, Mg and Ce, C and D are elements selected from the group consisting of Y, Dy, Zn, Ti, Mn, Fe, Co, Ni, Cu, Sn, Zr and Nd, a is within the range $0.03 \leq a < 1.5$ and b is within the range of $0.04 \leq b < 2$.

17. An exhaust gas purifying catalyst according to claim 16, wherein A is Ba, B is Ce, C is Y and D is Dy.

18. An exhaust gas purifying catalyst according to claim 16, wherein A is Sr, B is Ce, C is Nd and D is Zr.

19. An exhaust gas purifying catalyst according to claim 16, wherein said noble metal-series reducing catalyst is at least one element selected from the group consisting of Au, Pt, Ir, Rh, Ru and Pd.

20. An exhaust gas purifying catalyst according to claim 19, wherein
    the brown millerite composite oxide is in the form of particles having a surface,
    the noble metal-series reducing catalyst is in the form of the fine noble metal particles, and
    at least two kinds of fine noble metal particles are dispersed and fixedly mounted on the surface of brown millerite composite oxide particles.

21. An exhaust gas purifying catalyst according to claim 20, wherein an average particle diameter of said fine noble metal particles is less than 25 nm.

22. An exhaust gas purifying catalyst according to claim 19, wherein
    the noble metal-series reducing catalyst is in the form of fine noble metal particles,
    the brown millerite composite oxide is in the form of particles having a particle surface,
    the amount of fine noble metal particles is 20 to 200 mol. % of said brown millerite composite oxide, and the fine noble metal particles are dispersed on and adhered to the particle surface of said brown millerite composite oxide.

23. An exhaust gas purifying catalyst according to claim 16, wherein said noble metal-series reducing catalyst is at least two elements selected from the group consisting of Au, Pt, Ir, Rh, Ru and Pd.

24. An exhaust gas purifying catalyst according to claim 16, wherein the noble metal-series reducing catalyst is in the form of fine particles, the brown millerite composite oxide is in the form of particles, and the particles of said brown millerite composite oxide and the fine particles of said noble metal-series reducing catalyst are disposed in the same surface layer of a heat resistant carrier.

25. An exhaust gas purifying catalyst according to claim 24, wherein said heat resistant carrier is at least one carrier selected from the group consisting of alumina ($Al_2O_3$), silicon carbide (SiC) and a nickel series heat resistant alloy.

* * * * *

UNITED STATES PATENT AND TRADEMARK OFFICE
CERTIFICATE OF CORRECTION

PATENT NO. : 6,174,835 B1
DATED : January 16, 2001
INVENTOR(S) : Naito et al.

It is certified that error appears in the above-identified patent and that said Letters Patent is hereby corrected as shown below:

Title page,
Item [54], change title to -- Exhaust Gas Purifying Catalyst --.

Column 1,
Lines 51-52, change title to -- Exhaust Gas Purifying Catalyst --.

Column 5,
Line 50, change "In" to -- in --.

Column 6,
Line 41, delete [.] after "(RH)".
Line 59, change "even ly" to -- evenly --.

Column 7,
Line 5, change "ea" to -- Ba --.
Line 64, change "aft er" to -- after --.

Column 8,
Line 5, change "slur ry" to -- slurry --.
Line 24, change "beat" to -- heat --.
Line 64, change "was" to -- were --.

Column 9,
Line 13, change "above it" to -- above. It --.

Column 11,
Line 9, change "E1S" to -- E8 --.

Signed and Sealed this

Eleventh Day of December, 2001

*Attest:*

*Attesting Officer*

NICHOLAS P. GODICI
*Acting Director of the United States Patent and Trademark Office*